United States Patent
Lee et al.

(10) Patent No.: US 9,924,357 B2
(45) Date of Patent: Mar. 20, 2018

(54) METHOD FOR PROVIDING MOBILE COMMUNICATION PROVIDER INFORMATION AND DEVICE FOR PERFORMING SAME

(71) Applicant: KT CORPORATION, Seongnam-si (KR)

(72) Inventors: Hyung Jin Lee, Seoul (KR); Kwan Lae Kim, Seoul (KR); Joo Young Kim, Seoul (KR); Chul Hyun Park, Seoul (KR); Jin Hyoung Lee, Seoul (KR); Youn Pil Jeung, Seoul (KR)

(73) Assignee: KT Corporation, Seongnam-si (KR)

( * ) Notice: Subject to any disclaimer, the term of this patent is extended or adjusted under 35 U.S.C. 154(b) by 368 days.

(21) Appl. No.: 14/403,102

(22) PCT Filed: May 23, 2013

(86) PCT No.: PCT/KR2013/004536
§ 371 (c)(1),
(2) Date: Nov. 21, 2014

(87) PCT Pub. No.: WO2013/176502
PCT Pub. Date: Nov. 28, 2013

(65) Prior Publication Data
US 2015/0087269 A1    Mar. 26, 2015

(30) Foreign Application Priority Data

May 24, 2012  (KR) .................. 10-2012-0055412
May 22, 2013  (KR) .................. 10-2013-0057509

(51) Int. Cl.
*H04M 1/68*     (2006.01)
*H04W 12/06*   (2009.01)
(Continued)

(52) U.S. Cl.
CPC ............. *H04W 12/06* (2013.01); *H04L 63/08* (2013.01); *H04W 8/20* (2013.01); *H04W 12/04* (2013.01)

(58) Field of Classification Search
CPC ..... H04W 12/06; H04W 88/02; H04W 48/18; H04W 8/205; H04W 12/02; H04W 12/08;
(Continued)

(56) References Cited

U.S. PATENT DOCUMENTS

| | | | |
|---|---|---|---|
| 7,370,350 B1 * | 5/2008 | Salowey | G06F 21/445 380/259 |
| 2003/0093548 A1 * | 5/2003 | Cinghita | H04L 12/18 709/231 |

(Continued)

FOREIGN PATENT DOCUMENTS

| | | |
|---|---|---|
| KR | 10-2004-0041120 A | 5/2004 |
| KR | 10-2005-0040961 A | 5/2005 |

(Continued)

OTHER PUBLICATIONS

International Search Report for PCT/KR2013/004536 dated Aug. 20, 2013 [PCT/ISA/210].

*Primary Examiner* — Fred Casca
(74) *Attorney, Agent, or Firm* — Sughrue Mion, PLLC (57) ABSTRACT

A method for providing mobile communication provider information and a device for performing the same are disclosed. A terminal having an eUICC receives data, in which mobile communication provider information is capsulized and included, and stores the received data in the eUICC. Therefore, the mobile communication provider information can be transferred by applying the highest security scheme, and duplication of the eUICC due to the exposure of an authentication key by external hacking attacks can be prevented.

14 Claims, 7 Drawing Sheets

(51) Int. Cl.
*H04W 12/04* (2009.01)
*H04L 29/06* (2006.01)
*H04W 8/20* (2009.01)

(58) Field of Classification Search
CPC ......... H04W 8/26; H04W 4/02; H04W 76/02;
H04W 8/245; H04L 63/08; H04L
63/0892; H04L 9/3234; H04L 12/5695
USPC .......... 455/558, 411, 435.1, 410, 418, 432.1,
455/435.2, 414.1, 556.1
See application file for complete search history.

(56) References Cited

U.S. PATENT DOCUMENTS

| | | | |
|---|---|---|---|
| 2007/0294496 A1* | 12/2007 | Goss | G06F 12/1408 |
| | | | 711/163 |
| 2008/0089256 A1 | 4/2008 | Chun | |
| 2008/0285556 A1 | 11/2008 | Park et al. | |
| 2009/0106551 A1* | 4/2009 | Boren | H04L 9/0822 |
| | | | 713/158 |
| 2010/0287461 A1* | 11/2010 | Paila | H04N 21/235 |
| | | | 715/236 |
| 2012/0117635 A1* | 5/2012 | Schell | G06F 21/34 |
| | | | 726/9 |

FOREIGN PATENT DOCUMENTS

| | | |
|---|---|---|
| KR | 10-2008-0033686 A | 4/2008 |
| KR | 10-2008-0111374 A | 12/2008 |

\* cited by examiner

- RELATED ART -

FIG. 1

- RELATED ART -

| CLA | INS | P1 | P2 | Lc | DATA |
|---|---|---|---|---|---|
| 00 | 88 | 00 | SEE BELOW FOR REFERENCES | 22 | SEE BELOW FOR REFERENCES |

| | |
|---|---|
| P2 | AUTHENTICATION CONTEXT: 0x81 = UMTS AKA |
| DATA | AUTHENTICATION-RELATED DATA: |

| BYTE | CONTENT | LENGTH |
|---|---|---|
| 1 | RAND LENGTH (0X10) | 1 |
| 2-17 | RAND | 16 |
| 18 | AUTN LENGTH (0X10) | 1 |
| 19-34 | AUTN | 16 |

AUTN FORMAT

| BYTE | CONTENT | LENGTH |
|---|---|---|
| 1-6 | SQN ⊕ AK | 6 |
| 7-8 | AMF | 2 |
| 9-16 | MAC | 8 |

FIG. 8

| BYTE | CONTENT | LENGTH |
|---|---|---|
| 1 | 'DB'=UMTS AUTHENTICATION SUCCESS TAG | 1 |
| 2 | RES LENGTH (0X08) | 1 |
| 3-10 | RES | 8 |
| 11 | CK LENGTH (0x10) | 1 |
| 12-27 | CK | 16 |
| 28 | IK LENGTH (0x10) | 1 |
| 29-44 | IK | 16 |
| 45 | Kc LENGTH (0x08) | 1 |
| 46-53 | Kc | 8 |

FIG. 9

| BYTE | CONTENT | LENGTH |
|---|---|---|
| 1 | 'DC'=SYNCHRONIZATION FAILURE TAG | 1 |
| 2 | '0E'=AUTS LENGTH | 1 |
| 3-16 | AUTS | 14 |

AUTS FORMAT

| BYTE | CONTENT | LENGTH |
|---|---|---|
| 1-6 | $SQN_{MS} \oplus AK^*$ | 6 |
| 7-14 | MAC-S | 8 |

FIG. 10

METHOD FOR PROVIDING MOBILE COMMUNICATION PROVIDER INFORMATION AND DEVICE FOR PERFORMING SAME

CLAIM FOR PRIORITY

This application claims priority from Korean Patent Application Nos. 10-2012-0055412, filed on May 24, 2012, and 10-2013-0057509 filed on May 22, 2013 in the Korean Intellectual Property Office (KIPO), the disclosures of which are incorporated herein by reference in their entireties.

BACKGROUND

1. Technical Field

A method and a device consistent with an exemplary embodiment broadly relate to providing mobile communication provider information to a terminal having an embedded universal integrated circuit card (eUICC).

2. Related Art

A UICC is a smart card available as a tangible module which is inserted into a terminal and configured to perform user authentication with a mobile communication network that a user joins. The UICC may store the user's personal information such as a short message service (SMS) message and a phone book, an international mobile subscriber identity (IMSI), and information about a mobile communication provider that the user of a home public land mobile network (HPLMN) or the like joins.

The UICC may be referred to as a subscriber identity module (SIM) card in the case of a global system for mobile communications (GSM) scheme or a universal subscriber identity module (USIM) card in the case of a wideband code division multiple access (WCDMA) scheme.

When the user mounts the UICC into the terminal, the terminal automatically performs user authentication using information stored in the UICC and therefore, the user may conveniently use the terminal. Also, when the user switches to a new terminal, the user may easily switch to the new terminal while maintain a mobile communication service that the user joined and user information by removing the UICC from an existing terminal and mounting the removed UICC onto or into the new terminal. Alternatively, the user may conveniently change the mobile communication provider by replacing the UICC inserted into the terminal which is currently being used with the UICC of another mobile communication provider.

However, an embedded UICC (hereinafter abbreviated to an "eUICC") has been proposed to provide the same service as that of a detachable UICC even when the UICC is provided in a structure integrated with a terminal, for example, in a chip type inside the terminal instead of a detachable structure. In this instance, it is difficult to remove the eUICC from the terminal, for example, a structure in which the eUICC is manufactured to be mounted inside a machine to machine (M2M) communication terminal. This type of eUICC is externally difficult to replace. The eUICC may be mounted inside the terminal for durability to avoid damage during a fall or during heat.

Because the eUICC is integrated with the terminal during manufacture, it is difficult to change the mobile communication provider through the detachment of the eUICC due to characteristics of a physical structure in which the eUICC is not detachable from the terminal.

Accordingly, there is a need for a method of remotely providing information of a mobile communication provider to be changed to the eUICC in order to change the mobile communication provider of the terminal on which the eUICC is mounted.

However, a function of providing the information of the mobile communication provider to the eUICC, an interface for the function, and the like has not been specifically defined. Accordingly, there is a disadvantage in that the security is weakened when the method of providing the mobile communication provider information to a terminal having the existing UICC is directly applied to the terminal having eUICC.

SUMMARY

Accordingly, example embodiments may obviate one or more problems due to limitations and disadvantages of the related art.

Example embodiments provide a method of providing mobile communication provider information that may provide information of a mobile communication provider to an eUICC while maintaining high security and while maintaining the high security even after the mobile communication provider information is stored in the eUICC.

Example embodiments also provide a device for providing mobile communication provider information that may provide information of a mobile communication provider to an eUICC while maintaining high security and while maintaining the high security even after the mobile communication provider information is stored in the eUICC.

The aspects may be understood and will become clearer through the detailed description of exemplary embodiments.

In some exemplary embodiments, a method of providing mobile communication provider information includes: receiving data with an encapsulated mobile communication provider information; and storing the received data in an eUICC of a terminal, where the mobile communication provider information is not independently provided.

The receiving may include: receiving data with an encapsulated authentication-key information for authenticating the terminal. Also, the data may include an authentication processing module configured to authenticate the terminal.

Here, the receiving may include: receiving ciphering module data including software instructions for generating a format of the authentication-key information for authenticating the terminal different from a previous format.

The storing may include: storing, in the eUICC, the authentication processing module for authenticating the terminal. The mobile communication provider information may include an authentication key and the authentication key may be stored in the eUICC in a state in which the authentication key is encapsulated in the authentication process module.

After the authentication processing module is stored in the eUICC and authentication is performed in response to an authentication request provided from the terminal, the authentication processing module may provide one of an authentication success response, an authentication failure response, and a synchronization failure response, as a response for an authentication processing result to the terminal.

The method may further include after the authentication processing module is stored in the eUICC, preventing the authentication key from being exposed during use.

In other exemplary embodiments, a method of providing mobile communication provider information includes: generating, by a server of a mobile communication provider, an encapsulation module in which the mobile communication provider information is encapsulated; and transmitting the encapsulation module to the terminal.

The generating may include: generating the encapsulation module by encapsulating an authentication key as the mobile communication provider information and including the encapsulated authentication key in an authentication processing module for authentication of the terminal.

The generating may include: generating the encapsulation module in an applet file format.

The transmitting may include: transmitting the encapsulation module to subscription manager-data preparation (SM-DP); transmitting, by the SM-DP, the encapsulation module to subscription manager-secure routing (SM-SR); and transmitting, by the SM-SR, the encapsulation module to the specific terminal using an over the air (OTA) communication scheme.

In yet another exemplary embodiment, a an apparatus includes: an eUICC which is insertable into the apparatus, and the eUICC includes: an encapsulation module in which the mobile communication provider information is encapsulated; and a processing module configured to download the encapsulation module in which the mobile communication provider information is encapsulated and the eUICC is configured to authenticate a user of the apparatus with a mobile communication network using the encapsulated module and the processing module.

The encapsulation module may be an authentication module which includes an encapsulated authentication key for authenticating the apparatus and which includes instructions configured to authenticate the apparatus.

The processing module may receive an authentication request message from the apparatus and may provide the received authentication request message to the authentication processing module, and the processing module may further receive an authentication result from the authentication processing module and may provide the received response to the apparatus.

After authentication in response to an authentication request provided from the processing module, the authentication processing module may provide one of an authentication success response indicating an authentication success, an authentication failure response indicating an authentication failure, and a synchronization failure response indicating a synchronization failure to the device.

In the method and device for providing mobile communication provider information according to exemplary embodiments, an authentication key may be transferred using a highest security technique by encapsulating the mobile communication provider information to be transferred for an eUICC in arbitrary data such as an authentication processing module and transferring the data.

Accordingly, the mobile communication provider information may be transferred to the eUICC using a highest level of security even when mobile communication provider information is transferred through an open radio network to which security is not applied.

Also, an authentication key may be prevented from being exposed by an external hacking attack using an interface by encapsulating and storing the authentication key inside the eUICC and eliminating the interface capable of accessing the authentication key and therefore the duplication of the eUICC may be prevented.

BRIEF DESCRIPTION OF DRAWINGS

Example embodiments will become more apparent by describing in detail example embodiments with reference to the accompanying drawings, in which.

DETAILED DESCRIPTION OF EXAMPLE EMBODIMENTS

Example embodiments are described below in sufficient detail to enable those of ordinary skill in the art to embody and practice an embodiment of an inventive concept. It is important to understand that the present invention may be embodied in many alternate forms and should not be construed as limited to example embodiments set forth herein.

There is no intent to limit an inventive concept to the particular forms described herein. On the contrary, the inventive concept is to cover all modifications, equivalents, and alternatives falling within the spirit and scope of the appended claims.

The terminology used herein to describe embodiments of the invention is not intended to limit the scope of the invention. The articles "a," "an," and "the" are singular in that they have a single referent, however the use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Hereinafter, exemplary embodiments will be described in more detail with reference to the accompanying drawings. To facilitate the entire understanding of exemplary embodiments, the same reference numerals in the drawings denote analogous elements, and repetitive description of the same elements is omitted.

Figure 1:
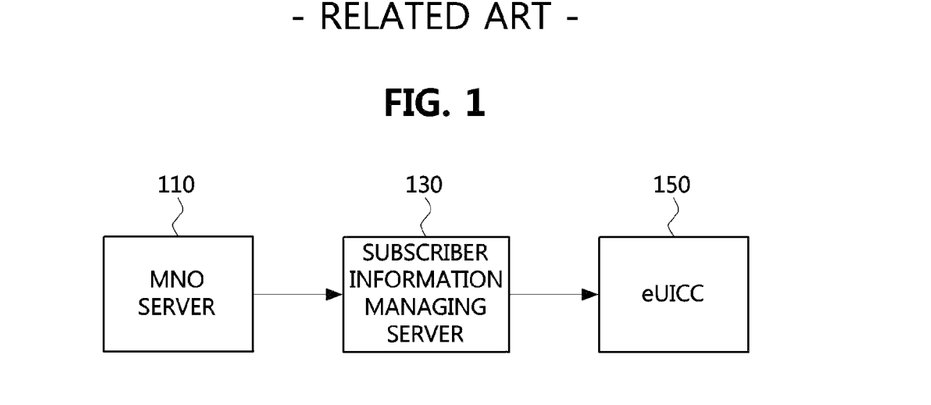
FIG. 1 is a diagram illustrating an environment in which mobile communication provider information is provided according to an example embodiment.

FIG. 1 is a conceptual diagram illustrating an environment in which a method of providing mobile communication provider information is performed according to an exemplary embodiment.

Referring to FIG. 1, the method of providing the mobile communication provider information according to an exemplary embodiment may be performed in an environment in which a mobile network operator (hereinafter referred to as an "MNO" server) 110, a subscriber information managing server 130, and an eUICC 150 are connected to each other through a network. The MNO server 110 and the subscriber information manager server 130, each may include at least a hardware processor and a memory.

The MNO server 110 generates mobile communication provider information to be provided in the eUICC 150 in order to provide a mobile communication service to a subscriber joining the mobile communication service provided in a mobile communication system such as wideband code division multiple access (WCDMA) or long term evolution (LTE). Here, the mobile communication provider information may be referred to as other terms such as an operator credential, an MNO credential, a profile, an eUICC profile, a profile package, and the like.

The subscriber information managing server 130 processes functions such as information management for the eUICC 150, information management for a plurality of mobile communication providers, and authentication and remote information changes according to a change in a mobile communication provider of a subscriber.

That is, the subscriber information managing server 130 performs the overall management for the eUICC 150 such as a process of issuing mobile communication provider information to the eUICC 150 and performing a procedure for a subscription change or a mobile communication provider change.

The subscriber information managing server 130 may include a subscription manager (hereinafter abbreviated to an "SM") or a profile manager (hereinafter abbreviated to a "PM").

The SM may include a subscription manager-data preparation (SM-DP) which is an entity configured to generate the mobile communication provider information and a subscription manager-secure routing (SM-SR) which is an entity configured to directly transfer the generated provider information to the eUICC 150.

The SM-DP configures a package to which security is applied by performing a ciphering process or the like on data to be provided by the mobile communication provider (MNO) to the eUICC 150 and then transfers the package to the SM-SR. Here, the package to which the security is applied includes the mobile communication provider information generated by the MNO server 110.

The SM-SR performs a function of routing the package to which the security is applied transferred from the SM-DP to other SM-SR so that the package is normally transferred to the destination eUICC 150 or directly transferring the package from the MNO server 110 to the eUICC 150. Here, in the process of transferring the package to which the security is applied, an OTA communication scheme to which the security is applied may be used.

The eUICC 150 extracts a package ciphered by the SM-DP by deciphering an OTA package transferred from the SM-SR through the OTA communication scheme, acquires real mobile communication provider information by deciphering the extracted package, and stores the acquired mobile communication provider information within the eUICC 150.

Figure 2:
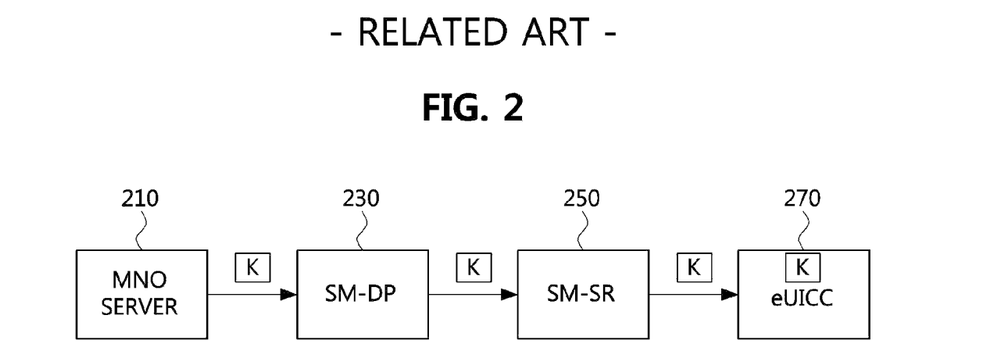
FIG. 2 is a diagram illustrating a method of providing mobile communication provider information according to an example embodiment.

FIG. 2 is a diagram illustrating a method of providing mobile communication provider information according to an exemplary embodiment. Hereinafter, for example, an authentication key K will be described as an example of the mobile communication provider information provided to the eUICC. This is provided by way of an example only and not by way of a limitation.

Referring to FIG. 2, first, an MNO server 210 generates a subscriber's authentication key K, a UICC data file (for example, a network connection file of an IMSI, an HPLMN, or the like), a user information file (for example, an SMS file, a phone book, or the like), and a file related to an applet or the like, and transfers the generated file to SM-DP 230.

The SM-DP 230 ciphers the file provided from the MNO server 210 and transfers the ciphered file to SM-SR 250. Here, the SM-DP 230 generates an OTA package including a file to be transferred to an eUICC 270 through the SM-SR 250. The OTA package may include the credential of the mobile communication provider (MNO) such as the subscriber's authentication key K, a UICC data file (for example, the IMSI or HPLMN) or the like.

The SM-SR 250 transfers the ciphered OTA package provided from the SM-DP 230 to the destination eUICC 270. Here, the SM-SR 250 may transfer the OTA package to the eUICC 270 using the ciphered OTA communication scheme.

The eUICC 270 acquires the authentication key K, the UICC data file, and the like by deciphering the ciphered OTA package transferred from the SM-SR 250, and then stores the authentication key K, the UICC data file, and the like.

The authentication key K ciphered by the SM-DP 230 and provided to the eUICC 270 is one of the pieces of the mobile communication provider information, as described above. That is, the authentication key K is used for authentication between a mobile communication provider network and a subscriber (or the eUICC 270) as a subscriber key shared between the eUICC 270 and an authentication center (AuC) of the mobile communication provider.

The authentication key has a highest importance level in security for authenticating the mobile communication provider network. If a value of the authentication key K is exposed, the eUICC 270 may be duplicated and a relevant subscriber's voice communication, an SMS/multimedia message service (MMS), a data service, and the like, may be hacked through duplication.

In the exemplary embodiment illustrated in FIG. 2, an example in which K, which is a highest level of important information in security, is transferred through a radio network using security (for example, a degree of simple ciphering) having the same level as other information (for example, an IMSI, an HPLMN, an SMS, a phone book, or the like) is shown.

Because subscriber authentication key information such as the authentication key K is stored by providing the authentication key K to the eUICC 270 during an opening process for a terminal, the subscriber authentication key information is provided to the eUICC 270 before the authentication between the eUICC 270 and the mobile communication provider network is achieved and an open radio network to which security is not applied is used in such a process.

Accordingly, a higher level of security is required to transfer the mobile communication provider information such as the authentication key K.

On the other hand, it is possible to use a separate interface for providing the authentication key K to the eUICC 270 so as to provide the authentication key K from a remote place. However, if there is an interface through which the authentication key K having a highest level of importance in security may be exchanged in any format (ciphering or non-ciphering), this means that the interface becomes significantly vulnerable to security attacks and a probability of hacking increases in a remote transmission process of the authentication key K.

That is, because the duplication of the eUICC 270 is possible when the authentication key K is exposed, the authentication key K is information having a highest level of importance with respect to security. Accordingly, it is necessary to transfer the authentication key K by applying highest security to the authentication key K and the highest security level should also be maintained for storing and using the authentication key K at the eUICC 270.

In order to satisfy requirements, as described above according to an exemplary embodiment, a method of applying a highest level of security to the authentication key K and maintaining the highest level of security even after the authentication key is downloaded into the eUICC 270 is provided in another exemplary embodiment.

As the method of applying the highest level of security to the authentication key K in the exemplary method of providing the mobile communication provider information according to another exemplary embodiment, a method of preventing information of the authentication key K from being independently used even in the process in which the eUICC 270 remotely receives the authentication key K and the authentication key K is used for authentication with the network of the mobile communication provider inside the eUICC 270, is applied.

In an exemplary embodiment, a process of authenticating the terminal is performed using a method of receiving an input value (for example, a random number or the like) from the network, performing preset calculation along with an internally stored authentication key, and transferring a calculation result to the network.

That is, the authentication key need not be transferred but is only needed in the eUICC 270 in the form in which the eUICC 270 may perform an authentication process with the mobile communication provider network using the authentication key internally. In an exemplary embodiment, it is unnecessary to independently transfer or output the information of the authentication key K.

Figure 3:
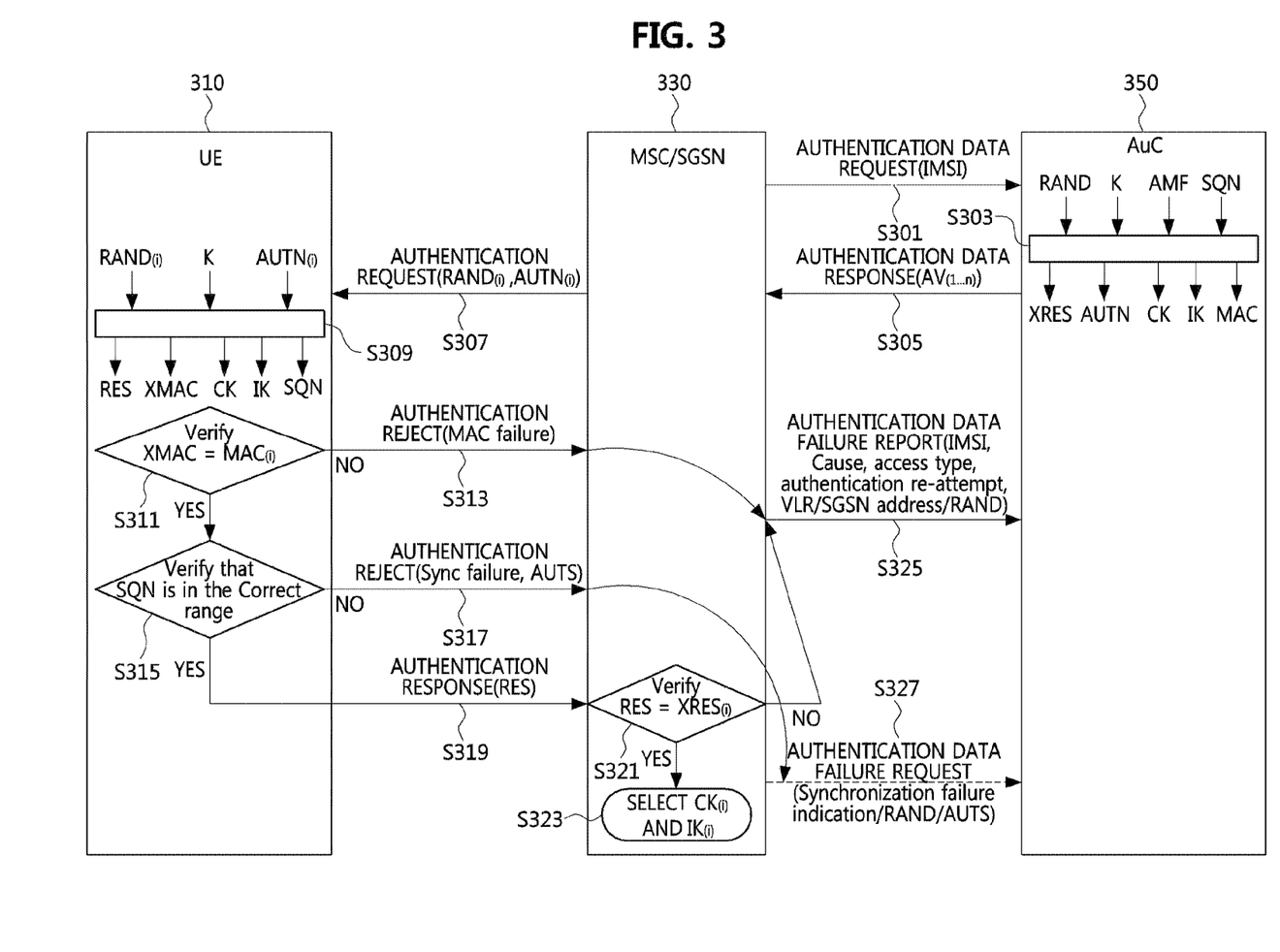
FIG. 3 is a flow diagram illustrating an authentication process between a terminal and a mobile communication provider network according to an exemplary embodiment.

FIG. 3 is a flow diagram illustrating an authentication process between a terminal and a mobile communication provider network according to an exemplary embodiment.

FIG. 3 illustrates a procedure of bi-directionally checking validity between the terminal (user equipment "UE") 310 and the network using the authentication key K shared between a Universal Subscriber Identity Module (USIM) mounted in the terminal 310 and an Authentication Center (AuC) 350 of the mobile communication provider. Parameters (a ciphering key (CK) and an integrity key (IK)) to be used for ensuring the confidentiality and integrity of data are generated by performing a procedure illustrated in FIG. 3.

Referring to FIG. 3, first, a mobile switching center (MSC) or a serving general packet radio service (GPRS) support node (SGSN) 330 requests subscriber authentication data by transmitting an authentication data request message to the AuC 350 so as to perform an authentication procedure, which includes authentication data request which includes International Mobile Subscriber Identity (IMSI) S301. In an exemplary embodiment, the authentication data request message may include IMSI information which is subscriber identification information of a mobile communication service.

The AuC 350 identifies a subscriber using IMSI information included in the authentication data request message received from the MSC or SGSN 330, and generates expected response (XRES), authentication token (AUTN), CK, IK, and message authentication code (MAC) values based on random number (RAND), K, authentication management field (AMF), and sequence number (SQN) values (operation S303).

Here, the RAND represents an arbitrary random number, and is generated from a home network operated by a predetermined mobile communication provider and transmitted to the terminal 310. K is a secret key and K is referred to as an authentication key and stored in the AuC 350 of the home network and the USIM mounted in the terminal 310. The AMF is used to provide the notification of a type of algorithm used at the time of authentication and a key value used when an authentication vector (AV) is generated. The SQN is a sequence number. A rule for generating the SQN may differ according to a mobile communication provider and is used to check that the AV received by the USIM is a new value.

The XRES is used when the validity for the USIM card is determined. The AUTN is constituted of the SQN+an anonymity key (AK), the MAC, and the AMF. The AK is used to prevent regularity of the SQN value from being externally exposed by masking the SQN value which is incremented every time the authentication is attempted. As a value to be used for a ciphering algorithm, the CK is used to cipher data to be transmitted between the terminal 310 and the MSC or SGSN 330. As a value to be used for the integrity algorithm, the IK is used to check the integrity of a signaling message to be transmitted and received through a wireless section. The MAC is used to determine the validity of the network in the terminal 310.

On the other hand, the AuC 350 configures an authentication data response (AV) including the RAND, the XRES, the CK, the IK, and the AUTN, and transmits n AVs (AV 1 to AV N) to the MSC or SGSN 330 through an authentication data response message (in operation S305). Here, one AV includes the RAND, the AUTN, the CK, the IK, and the XRES, and the AUTN is constituted of the SQN+the AK, the MAC, and the AMF. In addition, the n AVs (AV 1 to AV N) represent an array of n AVs, each of which basically has the RAND, the AUTN, the XRES, the CK, and the IK. That is, $AV_{(i)}$ represents an AV constituted of $RAND_{(i)}$, $AUTN_{(i)}$, $XRES_{(i)}$, $CK_{(i)}$, and $IK_{(i)}$.

The MSC or SGSN 330 selects an $AV_{(i)}$ to be used for authentication among the n AVs provided from the AuC 350, includes the selected $AV_{(i)}$ in an authentication request message, and transmits the authentication request message to the terminal 310, thereby transmitting $RAND_{(i)}$ and $AUTN_{(i)}$ among constituent elements of the selected AV ($AV_{(i)}$ to the terminal 310 (in operation S307).

The terminal 310 transfers $RAND_{(i)}$ and $AUTN_{(i)}$ included in the authentication request message received from the MSC or SGSN 330 to the USIM.

The USIM generates response (RES), expected message authentication code (XMAC), CK, IK, and SQN values using inputs of values of $RAND_{(i)}$ and $AUTN_{(i)}$ and a value of the authentication key K stored in the USIM card (in operation S309).

Thereafter, the USIM compares the MAC value provided from a radio network controller (RNC) to an XMAC value (in operation S311).

Upon determining that the MAC value and the XMAC value are different from each other, the USIM transmits an authentication reject message to the MSC or SGSN 330 (in operation S313). In an exemplary embodiment, the authentication reject message may include a MAC failure as information representing the cause of the authentication failure.

Alternatively, upon determining that the MAC value and the XMAC value are the same when compared to each other, the USIM determines whether the SQN value extracted from the AUTN is included in a predetermined SQN range (in operation S315).

In an exemplary embodiment, when the SQN is outside a predetermined range, the USIM generates an authentication re-synchronization token (AUTS), includes synchronization failure information representing an authentication failure cause and the generated AUTS in the authentication reject message and transmits the authentication reject message to the MSC or SGSN 330 (in operation S317). In an exemplary embodiment, the above-described exemplary AUTS includes an MAC-synchronization (MAC-S) and sequence number information mobile station/user equipment (SQNms)+AK.

Alternatively, in an exemplary embodiment, when the SQN is within the predetermined range in operation S315, the USIM includes the generated RES value in an authentication response message and transmits the authentication response message to the MSC or SGSN 330 (in operation S319).

The MSC or SGSN 330 compares a RES value received from the terminal 310 (or USIM) through the authentication response message to an XRES value stored in a visitor location register (VLR)/SGSN (in operation S321).

In an exemplary embodiment, when the RES value is the same as the XRES value, the MSC or SGSN 330 selects an IK and a CK from an AV array (in operation S323) and hence, the overall authentication procedure ends.

On the other hand, the MSC or SGSN 330 receives an authentication reject message from the terminal 310 in operation S313 or transmits an authentication failure report message to the AuC 350 when the RES value is different from the XRES value (in operation S327). In an exemplary embodiment, the authentication failure report message may include information such as an IMSI, an authentication failure cause, an access type, authentication re-attempt information, a VLR/SGSN address, and a RAND value.

In addition, upon receiving the authentication reject message from the terminal 310 in operation S317, the MSC or SGSN 330 may transmit an authentication data request message for re-attempting to perform authentication to the AuC 350 (in operation S327). In an exemplary embodiment, the authentication data request message may include synchronization failure indication information and RAND or AUTS information.

Referring to the authentication procedure, according to an exemplary embodiment, illustrated in FIG. 3, it may be seen that the terminal having the eUICC should process one authentication request message and three response messages, that is, an authentication response (RES) message, an authentication reject (MAC failure) message, and an authentication reject (synchronization failure) message, so as to perform an authentication function with the mobile communication provider network.

This means that, when the terminal processes the response in the above-described three types of the authentication request, the terminal may perform the authentication function with the mobile communication provider network independently, even when the authentication key K is absent from the eUICC.

In a method of providing the mobile communication provider information according to yet another exemplary embodiment, a method of encapsulating an authentication key within an arbitrary module (for example, an authentication processing module) rather than in an independent type and transferring the encapsulated authentication key when the authentication key is transferred from a device located at a remote position to the eUICC for the authentication processing method analogous to the one illustrated in FIG. 3 is used.

Figure 4:
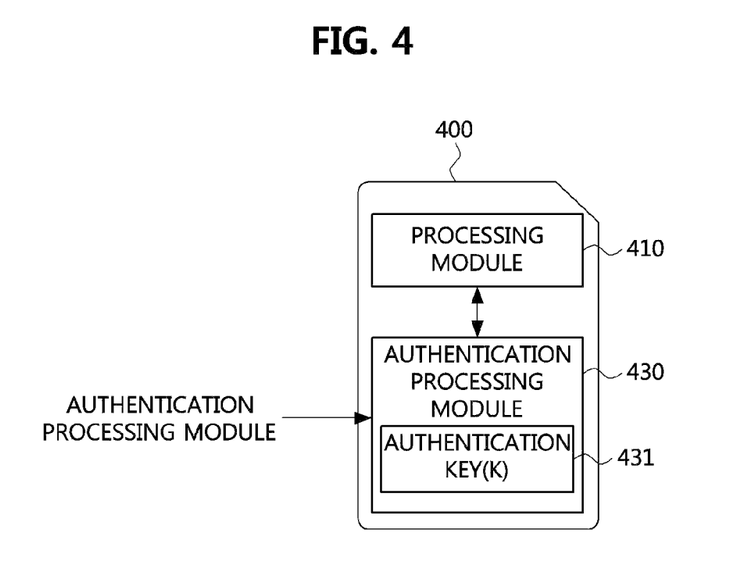
FIG. 4 is a view illustrating a configuration of an eUICC according to another example embodiment.

FIG. 4 is a block diagram illustrating a configuration of an eUICC to which a method of providing mobile communication provider information is applied according to yet another exemplary embodiment.

Referring to FIG. 4, the eUICC 400 may include a processing module 410 and an authentication processing module 430. In an exemplary embodiment, the processing module 410 may be implemented on a hardware microprocessor or as a separate hardware microprocessor. This is provided by way of an example only and other hardware components/circuitry are within the scope of the inventive concept.

The processing module 410 may perform a process necessary to download an authentication processing module 430, according to an exemplary embodiment. In addition, the processing module 410 may execute various applications related to the eUICC 400, according to an exemplary embodiment.

The authentication processing module 430 serves as a module for performing an authentication-related process and includes an internally encapsulated authentication key 431.

In another exemplary embodiment different from the above-described exemplary embodiment, the authentication key (K) 431, which is downloaded by the eUICC 400 from a mobile communication provider server, is not transferred independently and is encapsulated through a predetermined type of module and is transferred. In an exemplary embodiment, if the authentication key (K) 431 is encapsulated and transferred, this means that the authentication key (K) 431 is not transferred in independently.

Various types of modules may be used as a module to be used for encapsulation of the authentication key (K) 431. For example, the module to be used for encapsulation of the authentication key (K) 431 may be an arbitrary ciphering module capable of processing the authentication key (K) 431 along with other arbitrary information and generating the authentication key (K) 431 in a new format different from the original format.

Preferably, the encapsulation module may include the authentication processing module 430 configured to output one of the above-described three types of responses (that is, the authentication response (RES) message, the authentication reject (MAC failure) message, and the authentication reject (synchronization failure) message) using a specific value received by the terminal from the network as an input value (for example, a random number value).

In another exemplary embodiment, the authentication key (K) 431 is unlikely to be leaked due to hacking even when the eUICC 400 downloads the authentication key (K) 431 using an unauthenticated network because the authentication key (K) 431 is not transferred independently and/or a specific interface for transferring the authentication key (K) 431 is not used.

In addition, in an exemplary embodiment, it is possible to obtain the effect of applying a highest security level as follows by storing the authentication key (K) 431 inside the authentication processing module 430 of the eUICC 400.

In an exemplary embodiment, there is no interface with a terminal for generating or changing the authentication key (K) 431. When there is an interface through which the authentication key K having a highest level of importance in security may be exchanged independently without a modification as described above, there is a problem in that the interface is significantly vulnerable to security attacks and a probability of hacking increases. For example, when the hacking program finds an authentication algorithm and information about an interface with the authentication key K, the hacking program may operate like the authentication algorithm to extract the authentication key K. However, because the interface, as described above, is not used in another exemplary embodiment, the authentication key is unlikely to be hacked.

In addition, in another exemplary embodiment, the authentication key (K) 431 is prevented from being exposed by applying various security techniques to the authentication processing module 430.

For example, the authentication processing module 430 may conceal a position at which the authentication key (K) 431 is used in calculation on a memory through pseudo ciphering calculation. In addition, the calculated values are prevented from being estimated by initializing all buffers used at the time of ciphering/deciphering using the authentication key. In addition, illegal access is prevented by providing a countermeasure function at the time of ciphering/deciphering calculation using the authentication key. Here, because it is only necessary for the authentication key necessary for ciphering/deciphering to be provided within the authentication processing module 430, it is unnecessary to receive a newly assigned ciphering key (CK) even when the above-described security technique is applied.

In addition, in an exemplary embodiment, when the authentication key (K) 431 is provided inside the authentication processing module 430, a number of techniques capable of defending against external attacks as well as the above-described security techniques may be applied.

Figure 5:
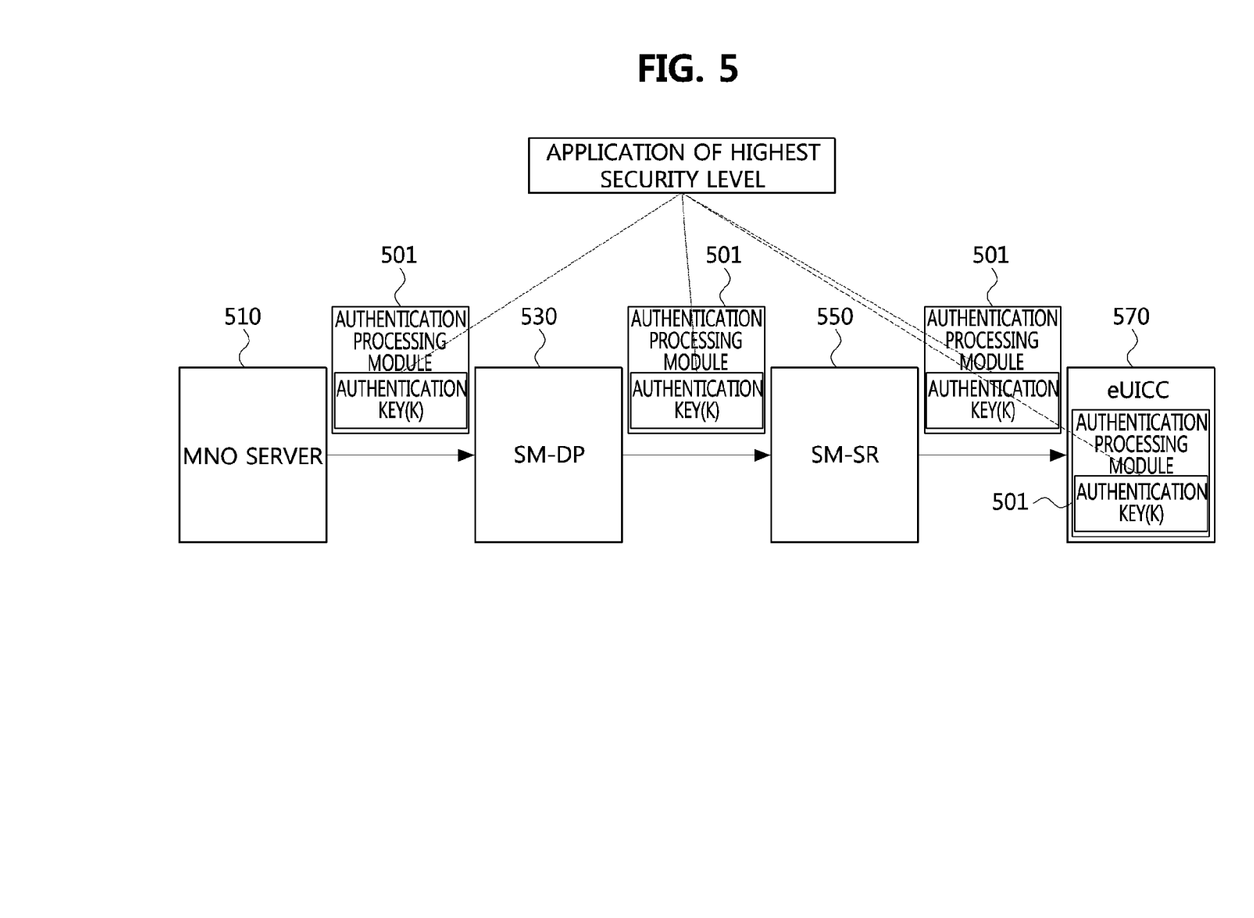
FIG. 5 is a diagram illustrating a method of providing mobile communication provider information according to another example embodiment.

FIG. 5 is a diagram illustrating a method of providing mobile communication provider information according to yet another exemplary embodiment, and illustrates a process in which the eUICC downloads a module in which the authentication key K is encapsulated from the MNO server.

Referring to FIG. 5, first, the MNO server 510 generates a module in which the subscriber's authentication key (K) is encapsulated and transfers the generated module to SM-DP 530. Here, the MNO server 510 may encapsulate the authentication key K using the authentication processing module 501. In addition, the MNO server 510 may generate the authentication processing module 501 in which the authentication key is encapsulated in a file (or library) having the same form (for example, .cap) as a general applet.

The SM-DP 530 transfers the authentication processing module 501 received from the MNO server 510 to SM-SR 550. Here, the SM-DP 530 may generate an OTA package by ciphering the authentication processing module 501 to be transmitted to the eUICC 570 through the SM-SR 550, and transfer the ciphered OTA package to the SM-SR 550.

The SM-SR 550 transfers the OTA package provided from the SM-DP 530 to a relevant destination eUICC 570. Here, the SM-SR 550 may transfer the OTA package to the eUICC 570 using the ciphered OTA communication scheme, and the ciphered OTA package may include the authentication processing module 501 in which the authentication key is encapsulated and included.

The eUICC 570 may decipher the ciphered OTA package transferred from the SM-SR 550, extract the authentication processing module 501 in which the authentication key is encapsulated, and internally store the extracted authentication processing module 501.

In the method of providing the mobile communication provider information according to another exemplary embodiment as illustrated in FIG. 5, it is possible to enhance security at a highest level for a transfer of an authentication key by encapsulating the authentication key transferred from the MNO server 510 to the eUICC 570 in another format of file (for example, the authentication processing module 501), ciphering the file, and transferring the ciphered file to the eUICC 570.

On the other hand, after the authentication processing module in which the authentication key is encapsulated is stored inside the eUICC, the eUICC should be able to perform an authentication function with the mobile communication provider network without the external exposure of the authentication key K.

Figure 6:
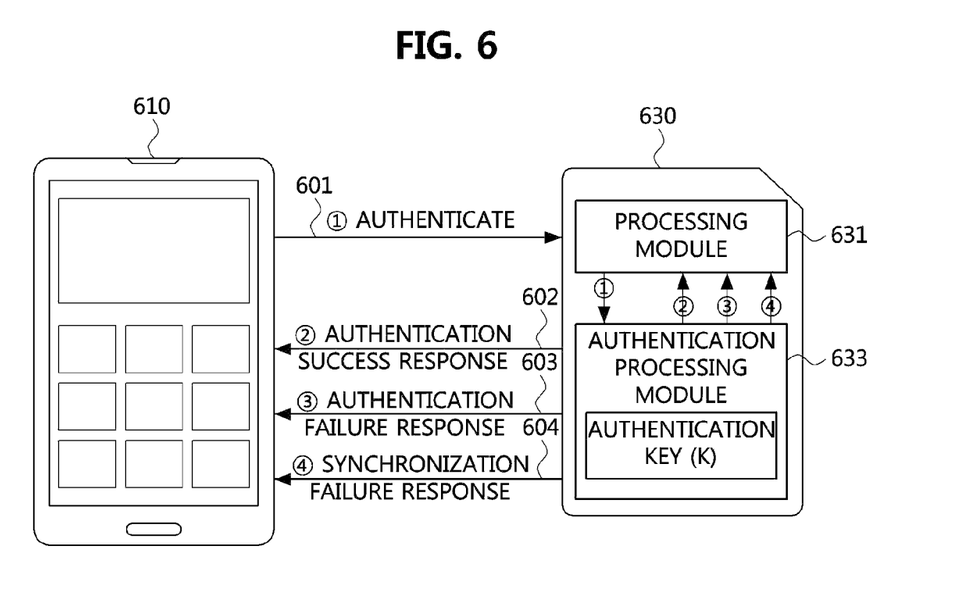
FIG. 6 is a flow diagram illustrating a process of performing an authentication process after an authentication key is stored in an eUICC according to another example embodiment.

FIG. 6 is a flow diagram illustrating a process of performing an authentication process after an authentication key is stored in an eUICC according to yet another exemplary embodiment.

Although a terminal 610 and an eUICC 630 are illustrated as independent blocks in FIG. 6, this is only for convenience of description. Actually, the eUICC 630 may be configured to be mounted in the form of a chip inside the terminal 610.

Referring to FIG. 6, when the eUICC 630 only provides a function for authentication with the mobile communication provider network by transmitting/receiving a message to/from a terminal 610 through an interface for one to four authentication processes, the terminal 610 may perform an authentication process in which the authentication key K is required even when the authentication key K is not downloaded independently.

That is, when the terminal 610 requests the processing unit of the eUICC to perform authentication through an authentication interface in operation 601 in a process of processing the authentication with the mobile communication provider network, the processing component 631 of the eUICC provides an authentication request to an authentication processing module 633.

After the authentication processing module 633 performs the above-described process in correspondence with the authentication request received from the processing component 631, a response for the authentication request is provided to the processing component 631 and the processing component 631 provides the terminal with a response message provided from the authentication processing module through a relevant interface among an authentication success response interface in operation 602, an authentication failure response interface in operation 603, and a synchronization failure response interface in operation 604.

In FIG. 6, each of the authentication interface, the authentication success response interface, the authentication failure response interface, and the synchronization failure response interface may be configured in the form of a message, according to an exemplary embodiment.

Hereinafter, with reference to FIGS. 7 to 9, interfaces for four authentication processes illustrated in FIG. 6 will be described in greater detail according to an exemplary embodiment.

Figure 7:
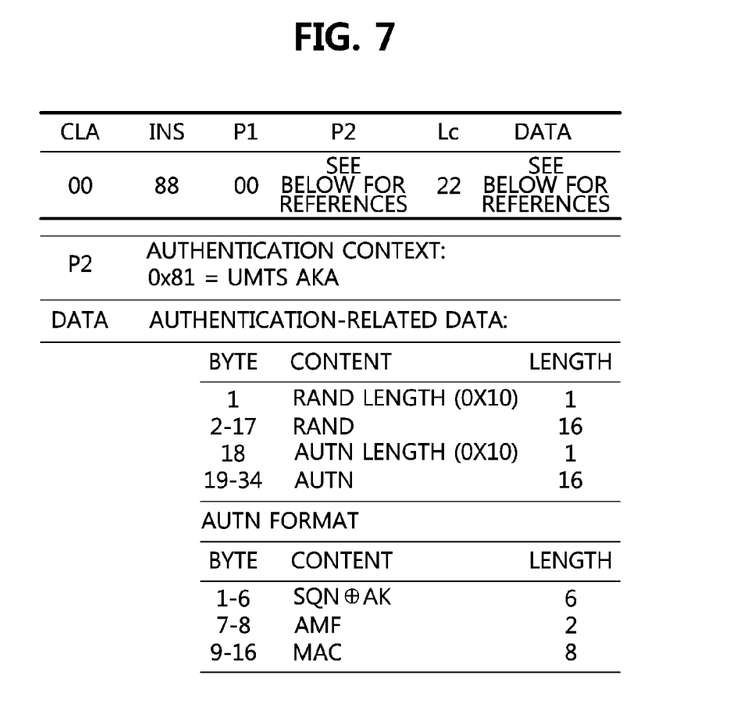
FIG. 7 is a view illustrating an authentication interface used in a method of providing mobile communication provider information according to another example embodiment.

FIG. 7 is a view illustrating an authentication interface to be used in a method of providing mobile communication provider information according to yet another exemplary embodiment. FIG. 8 is a view illustrating an authentication success response interface to be used in a method of providing mobile communication provider information according to yet another exemplary embodiment. FIG. 9 is a view illustrating a synchronization failure response interface to be used in a method of providing mobile communication provider information according to yet another exemplary embodiment.

First, referring to FIG. 7, the authentication interface (or authentication message) may include a CLA field for indicating a class of an instruction, an NS field for indicating the instruction, a P1 field for indicating a first parameter, a P2 field for indicating a second parameter, an Lc field for indicating a length of instruction (command) data, and a DATA field including authentication-related data. In an exemplary embodiment, the above-described DATA field may include the RAND and the AUTN provided from the network.

Upon receiving an authentication message from the terminal, the authentication processing module calculates an XMAC using the RAND and the secret key K. Thereafter, the authentication processing module compares a MAC included and transmitted in the AUTN to the calculated XMAC and determines whether the two values match. In addition, the authentication processing module checks whether an SQN is within a predetermined effective region.

Figure 8:
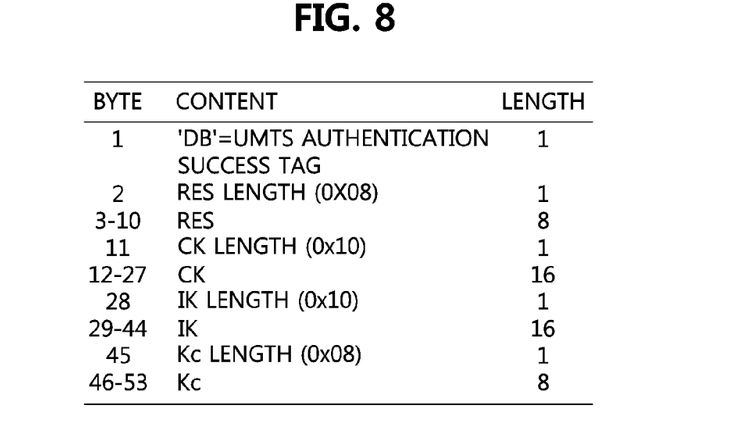
FIG. 8 is a view illustrating an authentication success response interface used in a method of providing mobile communication provider information according to another example embodiment.

If the MAC and the XMAC match and the SQN is within the effective region (within a predetermined range), the authentication processing module calculates an RES which is an authentication response and notifies the terminal that the authentication has succeeded using the authentication success response interface (or authentication success response message) as illustrated in FIG. 8. In an exemplary embodiment, the authentication processing module also transfers a CK and an IK calculated along with the RES to the terminal.

The authentication success response interface (or authentication success response message) may be configured as illustrated in FIG. 8 according to an exemplary embodiment. That is, the authentication success response interface may include a "DB" field, the RES for indicating an authentication value, a CK, an IK, and ciphering key (Kc) information of a second generation (2G) mobile communication scheme.

On the other hand, upon receiving an authentication success response message from the eUICC, the terminal includes the received authentication response (RES) within the authentication response message and transfers the authentication response message to the network.

The network (MSC or SGSN) receiving the authentication response from the terminal compares the authentication response (RES) included and transmitted by the terminal in the authentication response message to a pre-stored XRES. In an exemplary embodiment, when the RES is the same as the XRES, the terminal is authenticated on the network side.

When the terminal is authenticated on the network side, as described above according to an exemplary embodiment, the terminal and the network configure a security channel using a CK and an IK generated between the terminal and the network. Thereafter, reliability is ensured by performing communication using the security channel.

Alternatively, when a result of comparing the calculated XMAC to the MAC represents that the two values are different from each other, the authentication processing module of the eUICC transmits the authentication failure response message (or authentication failure response interface) in which status word (SW)=9082 is set to the terminal. In this case, the authentication and registration of the terminal in the network fail.

The terminal includes information indicating a failure cause within the authentication reject message in correspondence with the authentication failure response message provided from the eUICC and transfers the authentication reject message to the network.

On the other hand, synchronization management is performed to prevent a situation in which an unauthorized user acquires an AV directly transmitted without ciphering in a wireless section and makes an attack using the acquired AV. That is, the synchronization management means a process of preventing the AV which has been once used from being reused.

The authentication processing module checks the MAC and the SQN included within the AUTN transferred from the network, determines that the synchronization fails when the calculated XMAC is the same as the MAC transferred from the network but the SQN is not within an effective range, and replies with the synchronization failure response message (or synchronization failure response interface) for the terminal.

In general, the network (AuC) generates a larger SQN value than an SQN value stored in the authentication processing module and the authentication processing module updates the stored SQN value to the SQN value generated from the network when the authentication succeeds.

Figure 9:
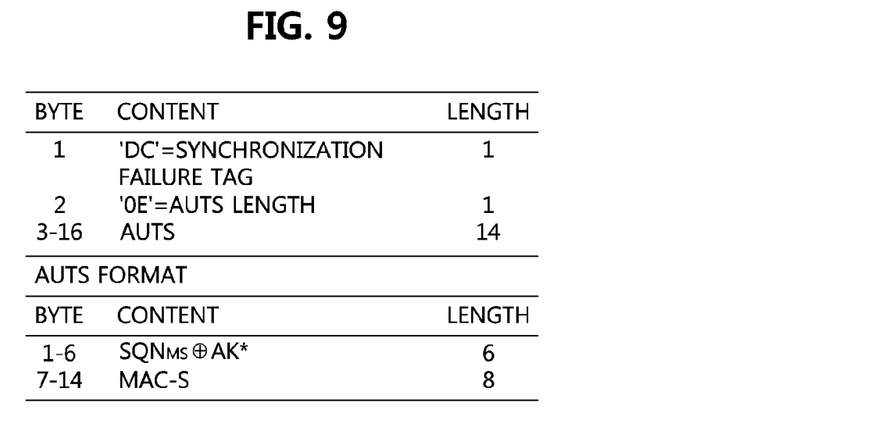
FIG. 9 is a view illustrating a synchronization failure response interface used in a method of providing mobile communication provider information according to another example embodiment.

The authentication processing module transmits the synchronization failure response message (or synchronization failure response interface) having the format as illustrated in FIG. 9, according to an exemplary embodiment, to the terminal when the synchronization fails.

As illustrated in FIG. 9, the synchronization failure response message may include "DC" indicating a synchronization failure tag, "OE" indicating a length of an AUTS, and AUTS information.

The network (AuC) generates a new AV including the AUTS transferred from the authentication processing module and the pre-stored RAND.

That is, the network performs a re-authentication procedure with the terminal by checking the MAC-S of the AUTS and generating the new AV after updating the SQN when the MAC-S value is valid. In general, the authentication should succeed after re-synchronization.

Figure 10:
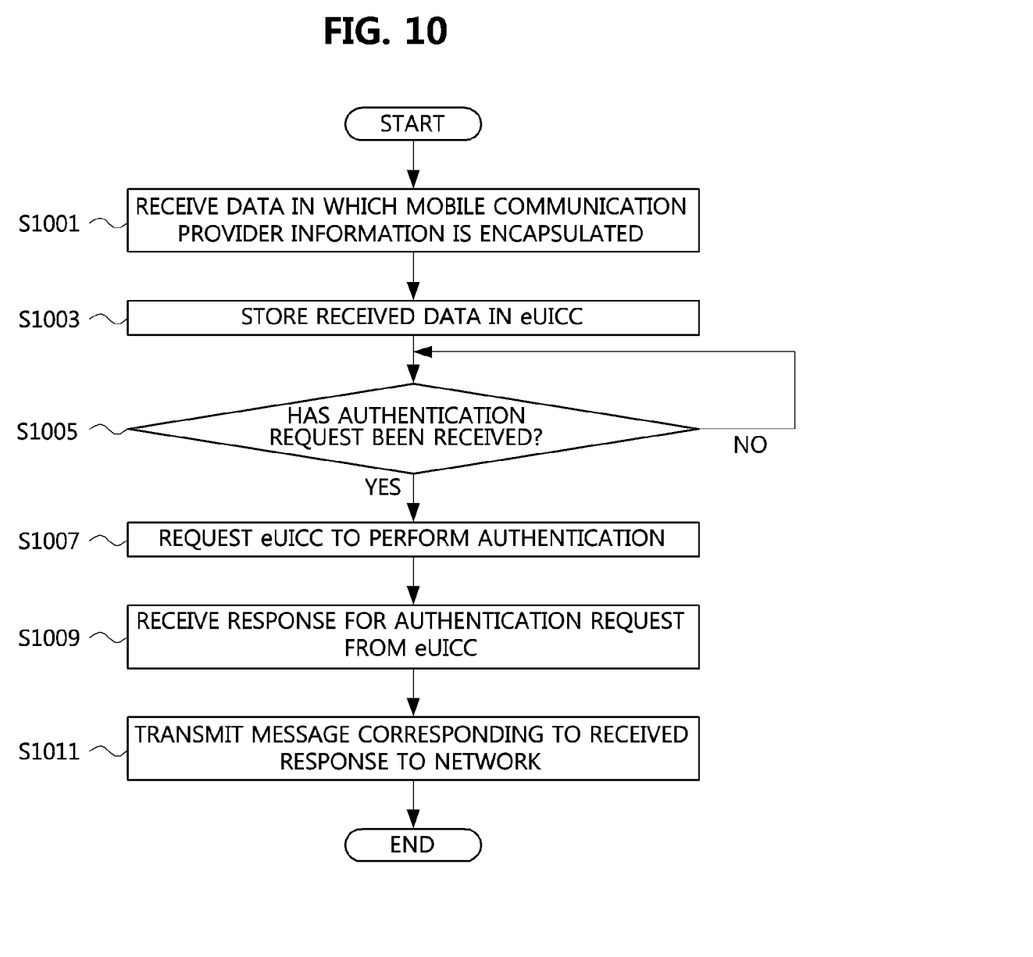
FIG. 10 is a flowchart illustrating a method of providing mobile communication provider information according to another example embodiment.

FIG. 10 is a flowchart illustrating a method of providing the mobile communication provider information according to yet another exemplary embodiment and further illustrating a processing process performed by a terminal having an eUICC according to an exemplary embodiment.

Referring to FIG. 10, first, the terminal receives data (for example, an authentication processing module) in which mobile communication provider information such as an authentication key or the like is encapsulated from the network (in operation S1001).

The terminal stores the above-described data within the above-described eUICC (in operation S1003). In an exemplary embodiment, the mobile communication provider information encapsulated and included in the received data is encapsulated in data and stored within the eUICC.

Thereafter, the terminal determines whether an authentication request is received from the network (in operation S1005). When the authentication request is received, parameters included in the above-described authentication request are transferred to the eUICC through the authentication interface (in operation S1007).

Thereafter, the terminal receives a response corresponding to the authentication request from the eUICC (in operation S1009). Accordingly to an exemplary embodiment, as described with reference to FIGS. 6 to 9, the response corresponding to the authentication request may be any one of the authentication success response, the authentication failure response, and the synchronization failure response.

The terminal transmits a message corresponding to the response received from the eUICC to the network (in operation S1011).

According to the method and device for providing mobile communication provider information according to exemplary embodiments, a transferred authentication key to be provided to the eUICC may be transferred using a highest security scheme. In general, because a profile of a mobile communication provider is absent within the eUICC before the terminal opens, authentication between the terminal and the mobile communication provider network is not performed and therefore the information of the mobile communication provider should be transferred through an open radio network to which security is not applied. In the method and device for providing mobile communication provider information according to exemplary embodiments, it is possible provide more security in such an environment.

In addition, in an exemplary embodiment, an authentication key is prevented from being exposed by an external hacking attack using an interface by encapsulating and storing the authentication key inside the eUICC and eliminating the interface capable of accessing the authentication key and therefore, the duplication of the eUICC may be prevented.

While the example embodiments have been described in detail, it should be understood that various changes, substitutions and alterations may be made herein without departing from the scope of the inventive concept. While certain exemplary embodiments have been described herein with reference to the illustrative drawings, it will be understood that many variations and modifications will be possible without departing from the scope and spirit of an inventive concept as set forth in the accompanying claims and their equivalents. One of ordinary skill in the art would readily appreciate that all exemplary embodiments and modifications conceived from the meaning and scope of the claims and their equivalents are included in the scope of the present disclosure.

What is claimed is:

1. A method of providing a mobile communication provider profile, the method comprising:
receiving data comprising the mobile communication provider profile, wherein the mobile communication provider profile is encapsulated and comprises an authentication key for authenticating a terminal; and
storing the received data in an embedded universal integrated circuit card (eUICC) of the terminal,
receiving a random number from an authentication server;
internally calculating a result value using at least the authentication key and the received random number; and
comparing the calculated result value with a result value of the authentication server to determine one of authentication success and authentication failure,
wherein the authentication key is not independently provided, and the authentication key is encapsulated in a predetermined module.

2. The method of claim 1, wherein the data comprises an authentication processing module configured to authenticate the terminal.

3. The method of claim 1, wherein the receiving comprises:
receiving ciphering module data comprising software instructions for generating a format of authentication key information for authenticating the terminal different from a previous format.

4. The method of claim 2, wherein the storing comprises:
storing, in the eUICC, the authentication processing module configured to authenticate the terminal,
wherein the authentication key is stored in the eUICC in a state in which the authentication key is encapsulated in the authentication processing module.

5. The method of claim 4, wherein, after the authentication processing module is stored in the eUICC and performs authentication of the terminal in response to an authentication request provided from the terminal, the authentication processing module provides, to the terminal, a result response for the authentication comprising one of an authentication success response, an authentication failure response, and a synchronization failure response.

6. The method of claim 4, further comprising:
after the storing of the authentication processing module in the eUICC, preventing the authentication key, which is in use, from being exposed to outside.

7. A method of providing a mobile communication provider profile, the method comprising:
generating, by a server of a mobile communication provider, an encapsulation module comprising an encapsulated mobile communication provider profile;
transmitting, by the server, the encapsulation module to a terminal;
receiving, by the terminal, the encapsulation module comprising the mobile communication provider profile, wherein the mobile communication provider profile is encapsulated and comprises an authentication key for authenticating the terminal;
storing, by the terminal, the received encapsulation module in an embedded universal integrated circuit card (eUICC) of the terminal;
receiving, by the terminal, a random number from the server;
internally calculating, by the terminal, a result value using at least the authentication key and the received random number; and
comparing, by the terminal, the calculated result value with a result value of the server to determine one of authentication success and authentication failure,
wherein the authentication key is not independently provided, and the authentication key is encapsulated in a predetermined module.

8. The method of claim 7, wherein the generating comprises:
adding the encapsulated authentication key to an authentication processing module configured to authenticate the terminal.

9. The method of claim 7, wherein the generating comprises:
generating the encapsulation module in an applet file format.

10. The method of claim 7, wherein the transmitting comprises:

transmitting the encapsulation module to a subscription manager-data preparation (SM-DP) entity;

transmitting, by the SM-DP entity, the encapsulation module to a subscription manager-secure routing (SM-SR) entity; and transmitting, by the SM-SR entity, the encapsulation module to the terminal using an over the air (OTA) communication scheme.

11. An apparatus configured to communicate in a mobile communication network comprising:

an embedded universal integrated circuit card (eUICC) insertable into the apparatus, wherein the eUICC comprises:

an encapsulation module, implemented by a processor, in which a mobile communication provider profile, comprising an authentication key for the authenticating of the apparatus, is encapsulated; and a processing module, implemented by the processor, configured to download the encapsulation module in which the mobile communication provider profile is encapsulated, and wherein the eUICC is configured to authenticate a user of the apparatus with the mobile communication network based on an encapsulated authentication key by performing:

receiving a random number from an authentication server;

internally calculating a result value using at least the authentication key and the received random number; and comparing the calculated result value with a result value of the authentication server to determine one of authentication success and authentication failure, and wherein the authentication key is not independently provided, and the authentication key is encapsulated in a predetermined module.

12. The apparatus of claim 11, wherein the encapsulation module comprises an authentication processing module, implemented by the processor, comprising instructions to authenticate the apparatus.

13. The apparatus of claim 12, wherein the processing module is further configured to receive an authentication request message from the mobile communication network and is further configured to provide the received authentication request message to the authentication processing module, and wherein the processing module is further configured to receive a response provided as an authentication result from the authentication processing module and is configured to provide the received response to the mobile communication network.

14. The apparatus of claim 12, wherein, in response to authenticating the apparatus based on an authentication request from the processing module, the authentication processing module provides one of an authentication success response indicating an authentication success, an authentication failure response indicating the authentication failure, and a synchronization failure response indicating a synchronization failure to the apparatus using the processing module.

* * * * *